F. W. SCHMIDT.
CONTROL FOR CHARGING STORAGE BATTERIES.
APPLICATION FILED AUG. 8, 1910.
976,750.
Patented Nov. 22, 1910.
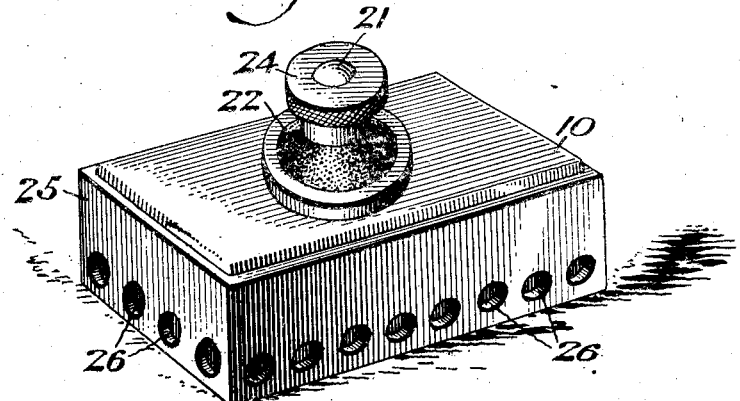
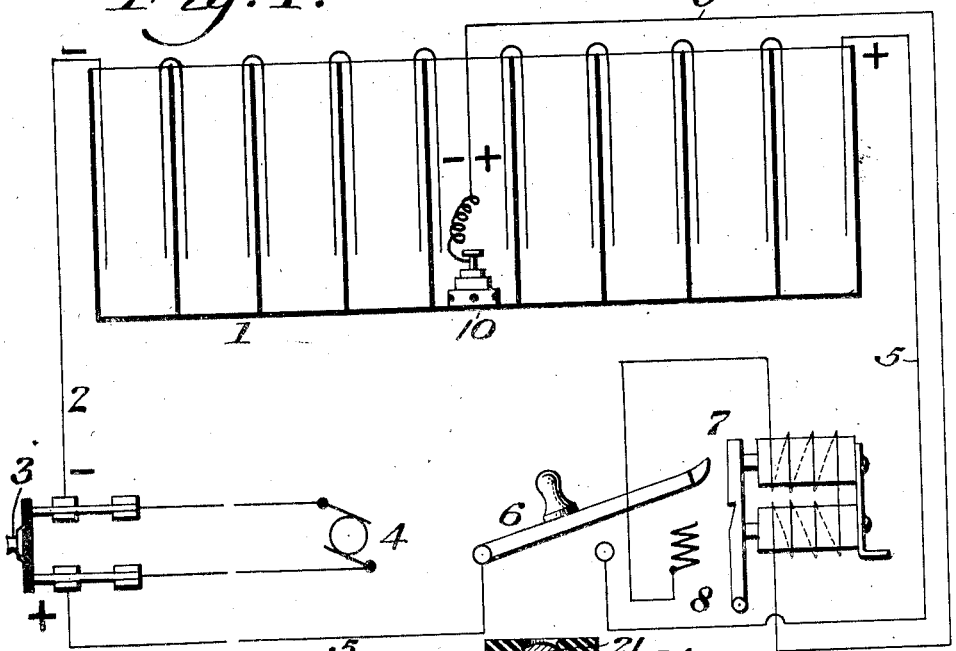
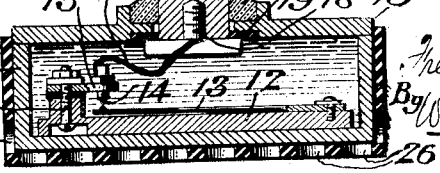
WITNESSES
P. F. Nagle
H. L. Dieterich
INVENTOR
Frederick W. Schmidt
By Wiederheim & Fairbanks
ATTORNEYS

UNITED STATES PATENT OFFICE.

FREDERICK W. SCHMIDT, OF PHILADELPHIA, PENNSYLVANIA.

CONTROL FOR CHARGING STORAGE BATTERIES.

976,750. Specification of Letters Patent. Patented Nov. 22, 1910.

Original application filed May 4, 1910, Serial No. 559,286. Divided and this application filed August 8, 1910. Serial No. 576,122.

*To all whom it may concern:*

Be it known that I, FREDERICK W. SCHMIDT, a citizen of the United States, residing in the city and county of Philadelphia, State of Pennsylvania, have invented a new and useful Control for Charging Storage Batteries, of which the following is a specification.

My invention consists of an improved device for cutting out the charging circuit in charging storage batteries at the rise of temperature in the same beyond a predetermined point.

It further consists of other novel features of construction, all as will be hereinafter fully set forth.

The annexed drawings and the following description set forth in detail, one mechanical form embodying the invention; such detail construction being illustrative of one of various mechanical forms in which the principle of the invention, as set forth in the concluding claims, may be embodied.

Figure 1 represents a diagram of a storage battery and its charging and controlling means, embodying my invention. Fig. 2 represents a perspective view of one form of thermostat applicable to my apparatus. Fig. 3 represents a longitudinal section of such thermostat.

Similar numerals of reference indicate corresponding parts in the figures.

Referring to the drawings:—The present invention is an improvement upon the invention disclosed in my co-pending application, Serial No. 537,803, filed Jan. 13, 1910, for battery temperature controller. Said latter consists essentially in a thermostatic device immersed in a storage battery during charging of the same and constructed to actuate a cut-out device in the charging circuit to cut out the battery when the temperature in the same rises beyond a predetermined point. This thermostat has a metallic, electrically-conductive but acid-resisting casing which usually contacts with one of the elements in the battery.

In the present apparatus, contact of the thermostat casing with an element of the battery is dispensed with, and the thermostat forms a terminal of the shunt circuit of the controlling means and within the battery and from the charging circuit.

The present invention is disclosed in my application for Letters Patent, No. 559,286, filed May 4, 1910, of which this application is a division, and I do not desire to claim in this application the subject-matter remaining claimed in said application.

In the diagram, Fig. 1, the battery to be charged is indicated by the numeral 1, having one conductor, 2, leading through a switch, 3, from one terminal of a generator, 4, and another conductor, 5, connected to the other terminal of the generator. This comprises the charging circuit. An automatic circuit breaker, in the present instance disclosed as a knife-switch, 6, is connected in the circuit and closes the same when the blade of the switch engages its terminals and is so held by a trigger which forms a part of or is connected to the armature of an electro-magnet, these parts forming a holding and releasing device, 7, for the circuit-breaker. The electro-magnet is wound in a branch or shunt circuit, one terminal, 8, of which is connected to the charging circuit through the circuit breaker, while its other terminal, 9, is connected to one contact member of the thermostat 10, which is immersed in the battery solution, when the device is in operation. All of these elements and connections are substantially the same as those disclosed in my above referred to application, and need not be specifically described.

The thermostat has a casing, 11, of lead or other electrically-conductive and acid-resisting metal, and a plate, 12, is secured to the bottom of this casing and in electric contact with the same. A composite strip, 13, such as usually employed in thermostats, is secured to this plate and will contact, when flexed by rise of temperature, with a contact-screw, 14, in an arm, 15, secured upon but insulated from a screw-post, 16, upon the base plate 12. The contact-screw is connected by a wire, 17, to a screw, 18, which is insulated from the cover of the casing by means of an insulating washer, 19, and projects outward through an opening in the cover. The enlarged base, 20, of a screw-post, 21, of lead or similar acid-resisting metal is secured upon the screw, and is insulated from the cover by an insulating filling, 22, also closing the opening in the cover. The screw-post 21 has a transverse hole, 23, through which the wire terminal of the branch or shunt circuit can be inserted and secured by a nut, 24, preferably of hard rubber or other acid-resisting and non-conducting material. The casing is tightly closed by its cover which is soldered or fused on, and its interior is completely filled with a heat-conducting but insulating liquid, such as transformer oil or similar oil, which will maintain insulation of the parts within the casing, conduct heat from the walls of the casing to the thermostat strip, and prevent the formation of an arc between the contact points and thus preserve the same from burning or fusing. The casing fits within an apertured insulating jacket, 25, of hard rubber or other insulating material, which will prevent metallic contact of the casing with the battery elements and at the same time give free conductive access for the solution to the surface of the casing. The apertures 26 of the jacket will permit the solution to act against all sides of the casing to convey a part of the battery-current to the same, but the jacket will prevent direct metallic contact of the casing with the elements of the battery and thus prevent short-circuiting by accidental contact of the casing with two elements.

When charging a battery, the terminals of the charging circuit, which has been closed at the main switch 3 and circuit-breaker, are connected to the binding posts or similar terminals of the battery, and the current from the generator will thus charge the battery. The thermostat, which is connected to one terminal of the shunt circuit, is placed in the battery, immersed in the solution. If, during the charging of the battery, the temperature in the latter rises above a predetermined degree,—usually about 105° Fahrenheit,—to which the thermostat has been adjusted to close contact, the contacts close the shunt-circuit through the same, as the casing of the thermostat forms a terminal in the battery and thus diverts a portion of the circuit flowing through the battery, to the shunt circuit. This will energize the electro-magnet in the shunt-circuit and cause the latter to attract its armature and release the circuit-breaker, which will thus cut out the battery from the charging circuit and prevent damage from overheating and overcharging. All of this operation is substantially like in the device of my first application, No. 537,803, above referred to, excepting in so far as the thermostat casing, or as much thereof as is metallic, is therein disclosed as in contact with a battery element, while in the present device, the shunt circuit derives its connection in the battery circuit by the thermostat casing forming a terminal of the shunt circuit in the battery without direct contact, in fact, being insulated from such contact by its jacket, but deriving its current when the contact of the thermostat is closed through the battery solution which carries the current.

As the charging of the storage batteries of electric vehicles is usually in the hands of more or less unskilled attendants, it is of importance to provide against accidental short-circuiting of the battery by accidental contact through the thermostat casing when the latter is placed or dropped into the battery solution, and this provision is furnished by inclosing the casing in its insulated jacket, and making the thermostat casing a terminal of the shunt circuit in the battery, active only when the contacts within it close by rise of temperature. At other times, of course, the casing is inert.

While for the present purpose it is more desirable to retain the insulating jacket, this latter feature does not form an essential part of the present invention, being the subject-matter of the claims in my application, No. 559,286, but such jacket is a desirable adjunct to the apparatus.

While the thermostat is disclosed as located between the elements of the battery but out of electrical contact with the same, it is evident that the insulated thermostat may be placed anywhere in the battery, as, for instance, upon two elements and straddling the space between them, so long as the thermostat is immersed in the battery solution to connect with the current through the same and to thus form a terminal of the shunt-circuit.

Having thus described my invention, what I claim as new and desire to secure by Letters Patent, is:—

1. In a device of the character stated, a charging circuit, a storage battery in said circuit, an automatically opening circuit-breaker in the circuit, a shunt circuit having one terminal connected to the charging circuit, an electro-magnetic retaining and releasing device for the circuit-breaker and wound in the shunt-circuit, and a thermostat immersed in the battery solution and inclosed in an acid-resisting metallic casing and having one contact connected to the shunt circuit and the other contact connected to the casing,—said casing thus forming a terminal of the shunt-circuit in the battery.

2. In a device of the character stated, a charging circuit, a storage battery in said circuit, an automatically-opening circuit-breaker in the circuit, a shunt-circuit having one terminal connected to the charging circuit, an electro-magnetic retaining and releasing device for the circuit-breaker and wound in the shunt circuit, and a thermostat immersed in the battery solution and having an electrically-conductive and acid-resisting casing electrically connected to one of its contacts and the other contact connected to the other terminal of the shunt circuit,— said thermostat thus forming a terminal of the shunt-circuit in the battery.

3. In a device of the character stated, a charging circuit, a storage battery in the same, an automatically-opening circuit-breaker having electro-magnetic controlling means, a shunt-circuit having one terminal connected to the charging circuit and connected to actuate said controlling means, and an incased thermostat immersed in the battery solution and having one contact connected to a terminal having electrical contact with the battery solution and one contact connected to the other terminal of the shunt circuit.

4. In a device of the character stated, a charging circuit, a storage battery in such circuit, means in said circuit for cutting out the battery, and a thermostat having an electrically-conducting and acid-resisting casing and wholly within the storage battery and connected to control said cutting out means.

5. In a device of the character stated, a charging circuit, a storage battery in such circuit, an automatically opening circuit-breaker in the charging circuit, a branch circuit having one terminal normally connected to the charging circuit by the circuit-breaker, a thermostat immersed in the battery solution and having a metallic element exposed to the same and having one contact connected to such element and the other contact connected to the other terminal of the branch circuit, and an electro-magnetic releasing device for the circuit-breaker and wound in the branch circuit.

FREDERICK W. SCHMIDT.

Witnesses:
 WM. CANER WIEDERSEIM,
 J. C. MCGLASHEN.